Figures 1, 2, 3, 4:
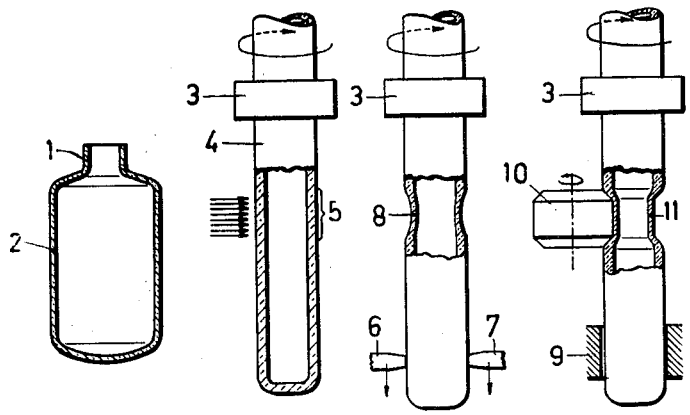

Sept. 21, 1965  B. F. H. CORBEEK  3,207,590

METHOD OF MANUFACTURING A BULB

Filed Dec. 12, 1961

INVENTOR
BERNARDUS F.H.CORBEEK
BY
AGENT

United States Patent Office 3,207,590
Patented Sept. 21, 1965

3,207,590
METHOD OF MANUFACTURING A BULB
Bernardus Franciscus Hendrikus Corbeek, Emmasingel, Eindhoven, Netherlands, assignor to North American Philips Company, Inc., New York, N.Y., a corporation of Delaware
Filed Dec. 12, 1961, Ser. No. 158,686
Claims priority, application Netherlands, Jan. 2, 1961, 259,649
2 Claims. (Cl. 65—105)

A method of manufacturing a bulb, having a substantially cylindrical neck, from a length of glass tubing is known, in which part of a length of tubing projecting downward from a rotary holder is made plastic by heating and subsequently widened in a hollow split mould by means of a difference in the pressures on either side of the glass wall.

By this method, bulbs for electric filament lamps for example, motor-car lamps, may be made from long lengths of glass tubing. With a view to the mechanical strength of these bulbs, it is of importance that there should be no excessive differences in wall thickness at different points of the bulb. In general, part of the length of glass tubing has to be widened, when plastic and this involves a decrease of the wall thickness. Usually, it may be assumed that in this known method of manufacturing bulbs there is a certain relationship between the diameter of the starting material and the widest portion of the product to be manufactured, and this relationship should not be exceeded if the finished product is to satisfy minimum strength requirements. Hence, there are certain limitations imposed on choosing the diameter of the tubular starting material.

The present invention overcomes this disadvantage in that the length of glass tubing to be made up into an article not only is widened locally but also is constricted at the neck portion of the article to be made. By using the method according to the invention in combination with a special method of heating, it is also ensured that the finished article at its neck shows a stress distribution such that the rim of the finished product has a smooth appearance, and this is of great importance for the further manipulation of such bulbs.

For this purpose, the method according to the present invention is characterized in that only a discrete portion of the length of glass tubing situated between the portion of the starting material to be widened and the holder is made plastic by heating and then, by drawing and subquent rolling, is converted into the neck portion of the bulb, after which a portion of the length of glass tubing situated below the rolled portion is softened by heating and widened in a hollow split-mould, and finally the article produced is severed from the length of glass tubing at the point of the drawn and rolled portion.

In the drawing and rolling operations, the thickness of the glass tubing wall is reduced or constricted by drawing and then rolled to a smaller diameter while being formed into the shape required for the neck of the finished article. By subsequently heating the portion of glass tubing situated below this neck portion, in which during cooling undesirable internal stresses may be produced, the neck is effectively annealed by the heat flowing into this portion, whereas in the usual or known techniques of glass manufacture annealing has to be separately performed.

A further advantage of the method according to the invention consists in that, the neck formed separately by drawing and rolling of the glass tubing is no longer plastic when the subsequent blowing operation is performed. Thus there is greater freedom in the choice of the weight of the glass situated below this neck part than in the usual or known technique of forming bulbs from glass tubing, in which the neck portion is plastic during the blowing operation.

A machine for carrying out the method according to the invention is fully disclosed in copending application No. 158,698. Such a machine which is provided with a number of positions for heating of a length of glass tubing extending below a holder and with a number of positions for converting this length into a bulb. It is characterized in that it is provided with a number of positions in which part of the glass tubing is drawn out by an apparatus, the elements of which can be moved apart, and with a number of positions in which this drawn out neck portion is shaped into the required form by one or a number of rollers, and finally with a number of positions situated between the rolling position and the positions in which the closed lower end of the glass tubing is shaped into its ultimate form by maintaining a difference in the pressure on either side of its wall. In the latter positions burners are directed to the glass so as to heat substantially only the part situated beneath the part formed by rolling.

In order that the invention may readily be carried into effect, an embodiment thereof will now be described, by way of example, with reference to the accompanying diagrammatic drawings, in which:

FIGURE 1 is longitudinal sectional view of a glass bulb, and

FIGURES 2 to 7 relate to successive operations in the process of manufacturing a bulb of the kind shown in FIGURE 1 from a length of glass tubing.

The bulb shown in FIGURE 1, which is to be used in the manufacture of an electric filament lamp, comprises a cylindrical neck portion 1 and a widened bulb-shaped portion 2. The wall thickness of this bulb, is substantially constant. This bulb may be made from a length of glass tubing in the following manner.

A length of glass tubing 4, which extends below a rotary holder 3 and is closed at its lower end, is heated and made plastic through a zone 5 by burners. The supply of heat to this zone is indicated by arrows in FIGURE 2. The plastic zone is drawn out by means of drawing members 6, 7 which move downwards with respect to the holder 3 (FIGURE 3), so that a reduced thickness or constriction 8 is formed in the tube wall. Subsequently, the diameter of the constriction is reduced. This may be effected by surrounding the lower end of the tubing by a centering member 9 and laterally pressing a rotary moulding roller 10 into the glass (FIGURE 4). These drawing and rolling operations enable the tubing 4 to be provided with the neck part 11, the diameter and wall thickness of which correspond to the diameter and the wall thickness of the neck portion 1 of the finished bulb. Thus, a part of the finished bulb as shown in FIGURE 1 is produced in the length of glass tubing 4. This neck portion has a diameter and a wall thickness which are smaller than those of the initial glass tubing.

Figures 5, 6, 7:
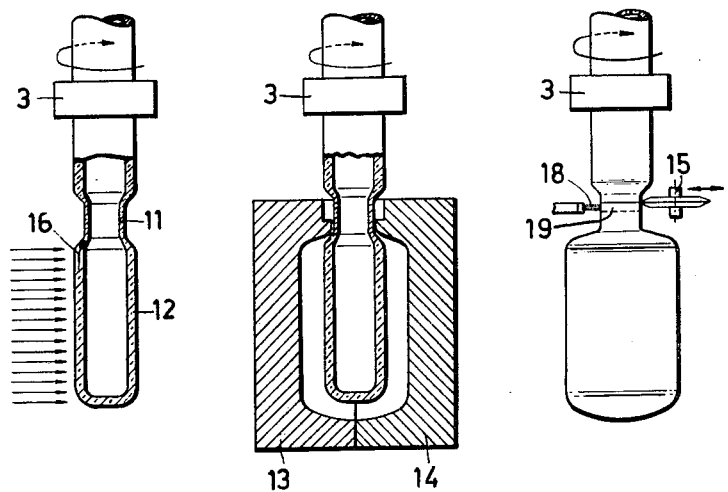

In a further stage of manufacture, the no longer plastic neck portion is heated and rendered plastic again. In FIGURE 5, the heat supply is indicated by arrows. Subsequently, the length of glass tubing is inserted in a hollow split-mould 13, 14 (FIGURE 6). By maintaining a difference in the pressures on either side of the wall of the plastic portion 12, this portion 12 is widened or expanded in the split mould. This may be effected by suction or blowing. By this operation, the wall thickness of the widened portion is reduced. By a suitable choice of the proportion of the initial glass tubing, it may be ensured that the wall thickness of the widened portion substantially corresponds to that of the bulb-shaped portion 2 shown in FIGURE 1. Thus, by the above-described method, a length of glass tubing is moulded in two stages.

After moulding in the hollow split mould 13, 14, the neck portion 11 is severed. This is effected by making a circular scratch by means of a rotary cutting wheel 15 in the neck portion 11, which is still hot after the shaping of the widened portion, and subsequently producing a narrow annular zone of stress (19) immediately below the scratch by means of compressed air (18) i.e. a technique referred to as thermocracking.

In severing, it is of importance that no inadmissible internal stresses are set up in the part to be severed, before an annular stressed zone is produced. These internal stresses may cause lack of smoothness of the edge made by severing. Hence, the glass to be severed is preferably annealed previously in a cooling furnace or the like before severing. It has been found that the internal stresses which are introduced into the solidified neck part 11 by the rolling operation, are substantially removed by heating part 12 in the manner shown in FIGURE 5, for this will cause a heat current to flow according to an arrow 16 to the comparatively thin-walled neck portion 11. This heat current also brings the neck portion to a very even temperature, which is substantially maintained when the diameter of the initial glass tubing is widened in the hollow split mould, because the neck portion 11 is not deformed in this mould. Thus, the above-mentioned method permits of satisfactory severing immediately after deformation of the glass tubing in the mould 13, 14, without the tubing part widened in the mould 13, 14 having to be annealed first.

In the embodiment described, the starting material is a length of glass tubing closed at the lower end. It will be appreciated that glass tubing open at both ends may be used as well. In this event, the lower end of the length of glass tubing will have to be closed by known means after the rolling operation and before the heating operation shown in FIGURE 5.

The method according to the invention may be used for manufacturing bulbs of widely different shapes.

What is claimed is:

1. A method of manufacturing a glass bulb from glass tubing having a closed end comprising forming the neck portion of said bulb by heating a discrete area of said tubing, axially drawing said tubing to reduce the thickness of the tube wall at said area, and shaping only said area by radially rolling to form the neck of said bulb, and allowing the neck portion of said tube to cool; forming the expanded portion of said bulb by separately heating the portion of said tube adjacent said neck portion to anneal said neck portion and soften said adjacent portion, blow molding said adjacent portion only, and substantially immediately severing the formed portion of said tube from the remainder thereof within the said drawn and rolled area.

2. A method of manufacturing a glass bulb from glass tubing having a closed end comprising forming the neck portion of said bulb by heating a discrete area of said tubing, axially drawing said tubing to reduce the thickness of the tube wall at said area, and shaping only said area by radially rolling to form the neck of said bulb, and allowing the neck portion of said tube to cool; forming the expanded portion of said bulb by separately heating the portion of said tube adjacent said neck portion to anneal said neck portion and soften said adjacent portion, blow molding said adjacent portion only, and substantially immediately severing the formed portion of said tube from the remainder thereof by thermocracking within the said drawn and rolled area.

References Cited by the Examiner

UNITED STATES PATENTS

| | | | |
|---|---|---|---|
| 2,110,327 | 3/38 | Dichter | 65—280 X |
| 2,935,819 | 5/60 | Dichter | 65—174 X |

DONALL H. SYLVESTER, *Primary Examiner.*